US007761431B2

(12) United States Patent
Blea et al.

(10) Patent No.: US 7,761,431 B2
(45) Date of Patent: Jul. 20, 2010

(54) CONSOLIDATING SESSION INFORMATION FOR A CLUSTER OF SESSIONS IN A COUPLED SESSION ENVIRONMENT

(75) Inventors: Donald Reynold Blea, Tucson, AZ (US); Robert Nelson Crockett, Tucson, AZ (US); Gregory Edward McBride, Vail, AZ (US); Alan George McClure, Sahuarita, AZ (US); David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1176 days.

(21) Appl. No.: 11/356,664

(22) Filed: Feb. 16, 2006

(65) Prior Publication Data

US 2007/0192454 A1    Aug. 16, 2007

(51) Int. Cl.
*G06F 7/00* (2006.01)
(52) U.S. Cl. .................................... 707/690
(58) Field of Classification Search .............. 707/1; 709/223
See application file for complete search history.

(56) References Cited

U.S. PATENT DOCUMENTS 6,006,259 A * 12/1999 Adelman et al. ............ 709/223
6,363,421 B2 * 3/2002 Barker et al. ............... 709/223
2006/0053216 A1 * 3/2006 Deokar et al. .............. 709/223

OTHER PUBLICATIONS

C. Warrick et al., "IBM TotalStorage Enterprise Storage Server: Implementing ESS Copy Services with IBM eServer zSeries", IBM Corporation, Document No. SG24-5680-04, Jul. 2004, Chaps. 1, 3 and 5.

* cited by examiner

*Primary Examiner*—Mohammad Ali
*Assistant Examiner*—Huawen Peng
(74) *Attorney, Agent, or Firm*—David W. Victor; Konrad Raynes & Victor LLP (57) ABSTRACT

Provided are a method, system, and program for consolidating session information for a cluster of sessions in a coupled session environment. Information for each of a plurality of sessions comprising a cluster is stored in a memory of a processor session. Each session associates at least one primary system and at least one secondary system, wherein within each session, updates are copied from the at least one primary system to the at least one secondary system. The session information in the memory for the plurality of sessions is processed to generate consolidated session information for the cluster based on the session information for the sessions in the cluster. The consolidated session information for the cluster is written to a master data set maintaining information for sessions.

18 Claims, 6 Drawing Sheets

FIG. 1

Individual Session Information

FIG. 2

Consolidated Session Information For Cluster

CONSOLIDATING SESSION INFORMATION FOR A CLUSTER OF SESSIONS IN A COUPLED SESSION ENVIRONMENT

BACKGROUND OF THE INVENTION

1. Field of the Invention

The present invention relates to a method, system, and program for consolidating session information for a cluster of sessions in a coupled session environment.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy. These different copy technologies are described in the IBM publications "The IBM TotalStorage DS6000 Series: Copy Services in Open Environments", IBM document no. SG24-6783-00 (September 2005) and "IBM TotalStorage Enterprise Storage Server: Implementing ESS Copy Services with IBM eServer zSeries", IBM document no. SG24-5680-04 (July 2004).

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. In certain backup system, a sysplex timer is used to provide a uniform time across systems so that updates written by different applications to different primary storage devices use consistent time-of-day (TOD) value as a time stamp. Application systems time stamp data sets when writing such data sets to volumes in the primary storage. The integrity of data updates is related to insuring that updates are done at the secondary volumes in the volume pair in the same order as they were done on the primary volume. The time stamp provided by the application program determines the logical sequence of data updates.

In many application programs, such as database systems, certain writes cannot occur unless a previous write occurred; otherwise the data integrity would be jeopardized. Such a data write whose integrity is dependent on the occurrence of previous data writes is known as a dependent write. Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

Consistency groups are formed within a session. All volume pairs assigned to a session will have their updates maintained in the same consistency group. Thus, the sessions are used to determine the volumes that will be grouped together in a consistency group. Consistency groups are formed within a journal device or volume. From the journal, updates gathered from a consistency group are applied to the secondary volume. If the system fails while updates from the journal are being applied to a secondary volume, during recovery operations, the updates that did not complete writing to the secondary volume can be recovered from the journal and applied to the secondary volume.

In a coupled session environment, such as the Coupled XRC environment (CXRC), multiple sessions spread across different processors coordinate their updates through a master data set that provide the time of the most recent update for every session in the coupled session environment. Sessions must write updated session information to the master data set for other sessions in the coupled environment to read in order to maintain data consistency across all sessions. Sessions need to access the master data set to determine the minimum of the most recent update times across all sessions so that no session applies updates greater than the minimum of the most recent update times. Sessions performing reads and writes to the master data set may lock other sessions out of performing such operations. As the number of sessions increase in as coupled session environment, the number of reads and writes to the shared master data set increases, which may cause delays for the other sessions trying to gain access.

For these reasons, there is a need in the art to provide techniques to improve the usage and management of the master data set.

SUMMARY

Provided are a method, system, and program for consolidating session information for a cluster of sessions in a coupled session environment. Information for each of a plurality of sessions comprising a cluster is stored in a memory of a processor session. Each session associates at least one primary system and at least one secondary system, wherein within each session, updates are copied from the at least one primary system to the at least one secondary system. The session information in the memory for the plurality of sessions is processed to generate consolidated session information for the cluster based on the session information for the sessions in the cluster. The consolidated session information for the cluster is written to a master data set maintaining information for sessions.

In a further embodiment, information on a session not included in the cluster is written to the master data set. The session not included in the cluster associates at least one primary system and at least one secondary system such that updates are copied from the at least one primary system to the at least one secondary system.

In a further embodiment, the processor comprises a first processor, wherein the session not included in the cluster is managed by a second processor, and wherein the first processor manages the copying of updates for the sessions in the cluster.

In a further embodiment, the cluster comprises a first cluster and the master data set is adapted to include information from additional clusters including sessions managed by additional processors.

In a further embodiment, processing the information comprises determining a most recent update time for each session indicated in the memory, wherein the consolidated information comprises a minimum of the determined most recent update times.

In a further embodiment, the master data set is adapted to include information from coupled sessions associating at least one primary storage and at least one secondary storage that are managed by additional processors. The additional processors read the consolidated information in the master data set to determine the minimum of the most recent update times across all the coupled sessions indicated in the master data set to maintain data consistency across coupled sessions.

In a further embodiment, processing the information comprises determining a value of an error flag for each session indicated in the memory, wherein the consolidated information comprises performing an OR operation on all the determined error flags, wherein additional processors managing additional sessions fails an update in response to determining that the consolidated error flag indicates an error.

In a further embodiment, processing the information comprises determining a value of a state flag for each session indicated in the memory. The consolidated information is generated by performing a first type of operation on the determined values to determine consolidated information for a first operation and performing a second type of operation on the determined values to determine consolidated information for a second operation.

In a further embodiment, the state flag indicates whether the session is consistent with all other sessions represented in the master data set, wherein the first type of operation comprises an OR operation and wherein the second type of operation comprises an AND operation.

In a further embodiment, the master data set is adapted to include information from sessions associating at least one primary storage and at least one secondary storage that are managed by additional processors. One processor managing at least one session processes the information for each cluster or session not included in a cluster indicated in the master data set to obtain a value providing information on all sessions indicated in the master data set and processes the value to determine whether to perform write updates from the primary system to the secondary system.

DETAILED DESCRIPTION

Figure 1:
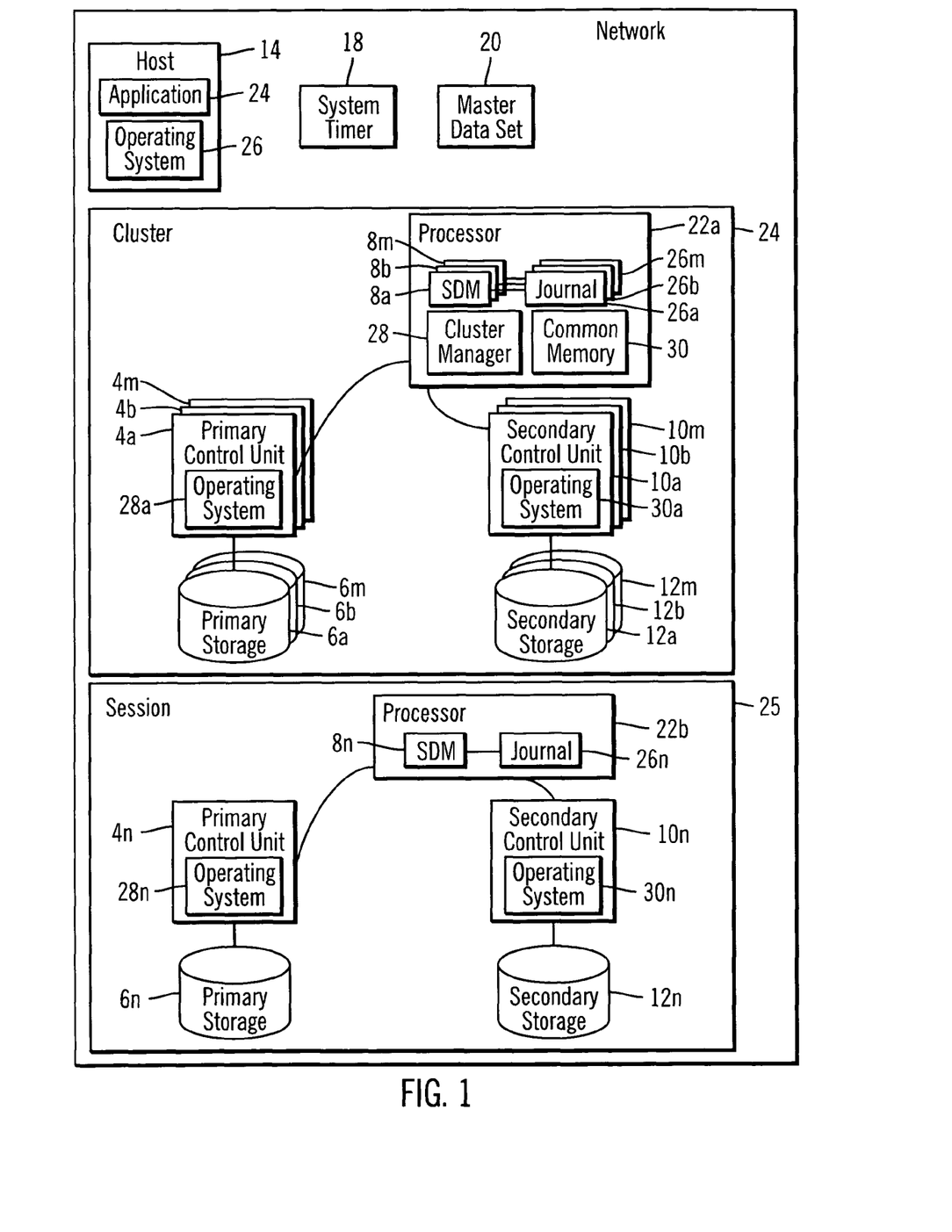
FIG. 1 illustrates an embodiment of a network computing environment.

FIG. 1 illustrates an embodiment of a network computing environment. A network 2 includes a plurality of primary control units 4a . . . 4m, 4n; primary storages 6a . . . 6m, 6n; data movers 8a . . . 8m, 8n managing the copying of updates to the primary storages 6a . . . 6m, 6n to secondary control units 10a . . . 10m, 10n and corresponding secondary storages 12a . . . 12m, 12n; a host 14 writing updates to the primary storages 6a . . . 6m, 6n; a system timer 18; and a master data set 20. The data movers 8a . . . 8m, 8n are implemented in processors 22a and 22b. The components 4a . . . 4m, 4n, 6a . . . 6m, 6n, 8a . . . 8m, 8n, 10a . . . 10m, 10n, 12a . . . 12m, 12n, 14, 18, 20, 22a, 22b are connected to the network 2 and the network 2 enables communication among these components. The network 2 may include one or more switches to provide one or more paths of communication between the different network 2 elements.

In described embodiments, a single processor 22a may include multiple system data mover (SDM) programs 8a . . . 8m, where each SDM 8a . . . 8m manages the transfer of updates for one or more sessions. Each session associates primary and secondary volumes such that updates applied to the primary volumes are copied to the associated secondary volumes. The primary and secondary volumes associated in one session may be managed by one or more primary control units 4a . . . 4m and one or more secondary control units 4a . . . 4m. Multiple sessions maintained by a single processor 22a comprise a cluster 24. Thus, a cluster 24 represents sessions managed within a single processor 22a. Each session may be assigned its own address space in the processor 22a.

An individual session, such as individual session 25, is not included within a cluster of multiple sessions. In such case, the processor 22b maintaining the SDM 8n for the individual session 25 does not include SDMs for any other sessions. FIG. 1 shows only one cluster 24 and one individual session 25 that are maintaining data consistency. In additional embodiments, there may be multiple clusters and multiple individual sessions not part of a cluster. In further embodiments, one processor may implement multiple sessions that are not coupled in a cluster, such that each session implemented in the single processor comprise unclustered, individual sessions.

System data mover (SDM) programs 8a . . . 8n read updates from the primary storages 6a . . . 6n and form consistency groups of updates from the primary storage 6a . . . 6n to write to the corresponding secondary storage 12a . . . 12n. At the primary control units 4a . . . 4n, updates may be written to a side file in a cache of the primary control units 4a . . . 4n. The updates may then be transferred to journals 26a . . . 26n maintained by the SDMs 8a . . . 8n. The journals 26a . . . 26n may be implemented on a disk storage device. Within each of the journals 26a . . . 26n, the updates are arranged into consistency groups. The journals 26a . . . 26n may store one or more consistency groups. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

Consistency groups are formed within a session. All primary and secondary volume pairs assigned to a session will have their updates maintained in the same consistency group. Thus, the sessions are used to determine the volumes that will be grouped together in a consistency group. If the system fails while updates from the journal 26a . . . 26n are being applied to a secondary volume, during recovery operations, the updates that did not complete writing to the secondary volume can be recovered from the journal 26a . . . 26n and applied to the secondary volume.

In FIG. 1, the SDMs 8a . . . 8n comprise programs implemented in the processors 22a, 22b. In an alternative embodiment, the SDMs 8a . . . 8n may be implemented in other systems, such as the primary control units 4a ... 4n, secondary control units 10a ... 10n, etc.

A processor 22a managing multiple sessions for the cluster 24 includes a cluster manager 28 program that manages the reading and writing of session information to the master data set 20. The SDM 8n writes the session information for a session not within a cluster to the master data set 20. The processor 22a managing a cluster of sessions also includes a common memory 30. Session information within a cluster 24 is written to the common memory 30. The cluster manager 28 consolidates the session information in the common memory 30 for multiple sessions and writes consolidated session information for all sessions in the cluster 24 to the master data set 20. Further, the cluster manager 28 consolidates information in the master data set 20 to provide to sessions in the cluster 24 to use when the session SDMs 8a ... 8m copy updates from the primary to secondary storages.

The master data set 20 includes a list of the sessions whose consistency is maintained across sessions. The master data set 20 list includes information for individual sessions not part of a cluster 24 and a single consolidated entry for each cluster providing consolidated information for all sessions in the cluster 24. The master data set 20 may reside on volumes in the storages 6a ... 6n, 12a ... 12n and stored in a disk storage device. The journal data sets 26a ... 26n for a primary/secondary control pair may reside on any device. In FIG. 1, each SDM 8a ... 8n is part of one session whose information is indicated in the master data set 20. The cluster manager 28 and individual SDMs 8n are enabled to access the master data set 20.

The system timer 18 provides the time stamps for updates to insure that a common time is used across all SDMs 8a ... 8n to provide a common time reference for application programs writing updates to volumes to insure that updates are not mirrored out-of-sequence. Once updates in the journal 26a ... 26n are organized within a consistency group, then the updates within a consistency group are applied to the secondary storages 12a ... 12n. The creation of consistency groups guarantees that the system will shadow data to a remote site in real time with update sequence integrity for any type of data. Using consistency groups ensures that updates applied to the secondary storages 12a ... 12n within a session are consistent as of the consistency time of the consistency group and consistent between sessions. If a failure occurs while updates are written from the journal 22a ... 22n to secondary volumes in the secondary storage 12a ... 12n, then during recovery, the updates that were interrupted during system failure can be recovered from the journal and reapplied to the secondary volume. In this way, data is insured consistent within and across sessions during recovery as of a point in time. The copy operations use the master data set 20 to maintain consistency across sessions, such as International Business Machine Corporation's ("IBM") Extended Remote Copy (XRC), Coupled XRC (CXRC), Global Copy, Global Mirror Copy, and synchronous mirroring such as Peer-to-Peer Remote Copy (PPRC).

The network 2 may comprise a Storage Area Network (SAN), Local Area Network (LAN), Intranet, the Internet, Wide Area Network (WAN), peer-to-peer network, wireless network, arbitrated loop network, etc. The storages 6a ... 6n, 12a ... 12n may comprise an array of storage devices, such as a Just a Bunch of Disks (JBOD), Direct Access Storage Device (DASD), Redundant Array of Independent Disks (RAID) array, virtualization device, tape storage, flash memory, etc. The processors 22a, 22b may comprise separate systems having an operating system or comprise one of multiple logical partitions (LPARs) or virtual processors implemented in a single system.

The primary 4a ... 4n and secondary control units 10a ... 10n include operating systems 32a ... 32n and 34a ... 34n, respectively, and mirroring programs to perform the copy operations. The host 14 includes an operating system 36 and one or more applications 38 that communicate I/O requests to the primary control units 4a ... 4n.

Figure 2:
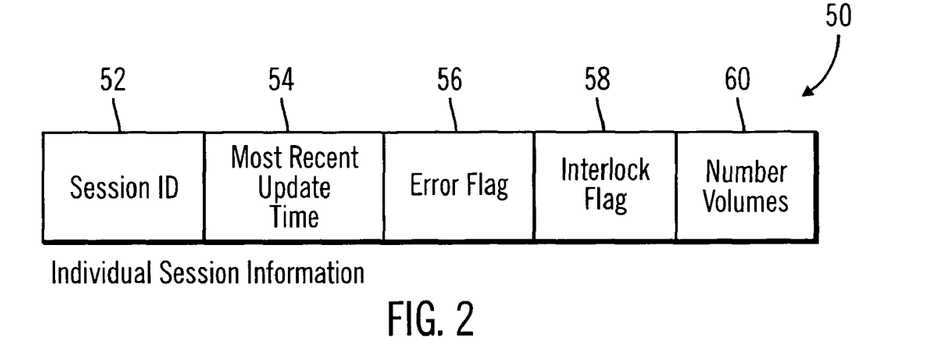
FIG. 2 illustrates an embodiment of individual session information.

FIG. 2 illustrates an embodiment of individual session information 50. The individual session information 50 may comprise the session information each SDM 8a ... 8m in a cluster 24 writes to the common memory 30 or the session information for a an individual session 25 that the SDM 8n writes to the master data set 20. The individual session information 50 includes a session identifier (ID) 52; a most recent update time 54 of the most recent update at the primary control unit 4a ... 4n written to the journal 26a ... 26n; an error flag 56 indicating whether an error has occurred for the session; an interlock flag 58 indicating whether the session is consistent with respect to the other sessions for which information is maintained in the master data set 20; and a number of volumes field 60 indicating a number of volumes included in the session.

Figure 3:
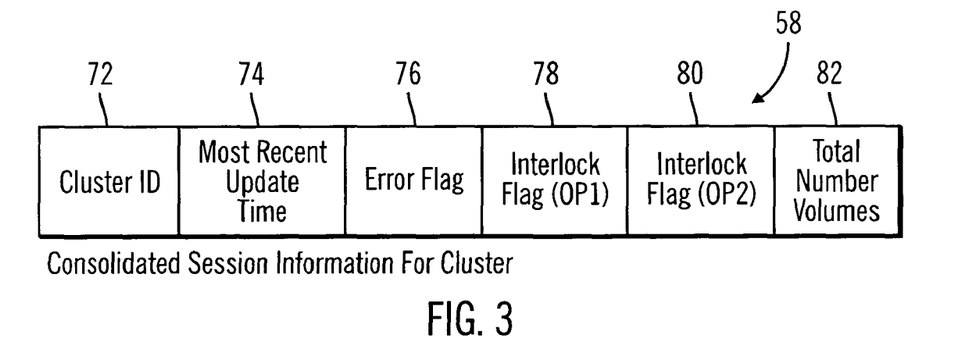
FIG. 3 illustrates an embodiment of consolidated session information.

FIG. 3 illustrates an embodiment of consolidated session information 70 generated by the cluster manager 28 from the individual session information 50 maintained in the common memory 30 for the sessions in the cluster 24. The consolidated session information for one cluster 24 includes: a cluster identifier 72; a most recent update time 74 for all sessions in the cluster 24; a consolidated error flag 76 which may be formed by ORing the error flags 56 for the individual session information 50 for all sessions in the cluster 24; two consolidated interlock flags 78 and 80 formed by performing different operations on the interlock flags 58 for the individual session information 50 for all sessions in the cluster 24; and a total number of volumes 82 comprising the total number of volumes in all the clustered sessions. For instance, the first interlock flag 78 may be formed by ORing all the individual interlock flags 58 for the sessions in the cluster 24 and the second interlock flag 80 may be performed by ANDing all the individual interlock flags 58 for the sessions in the cluster 24. The reason for maintaining different consolidated values for the interlock flags is that the different operations/functions may require consolidated information formed in different manners, such as ORing versus ANDing the values.

FIGS. 2 and 3 illustrate one embodiment of the individual and clustered session information, respectively. In additional implementations, different or additional information may be included for the individual and clustered session information.

Figure 4:
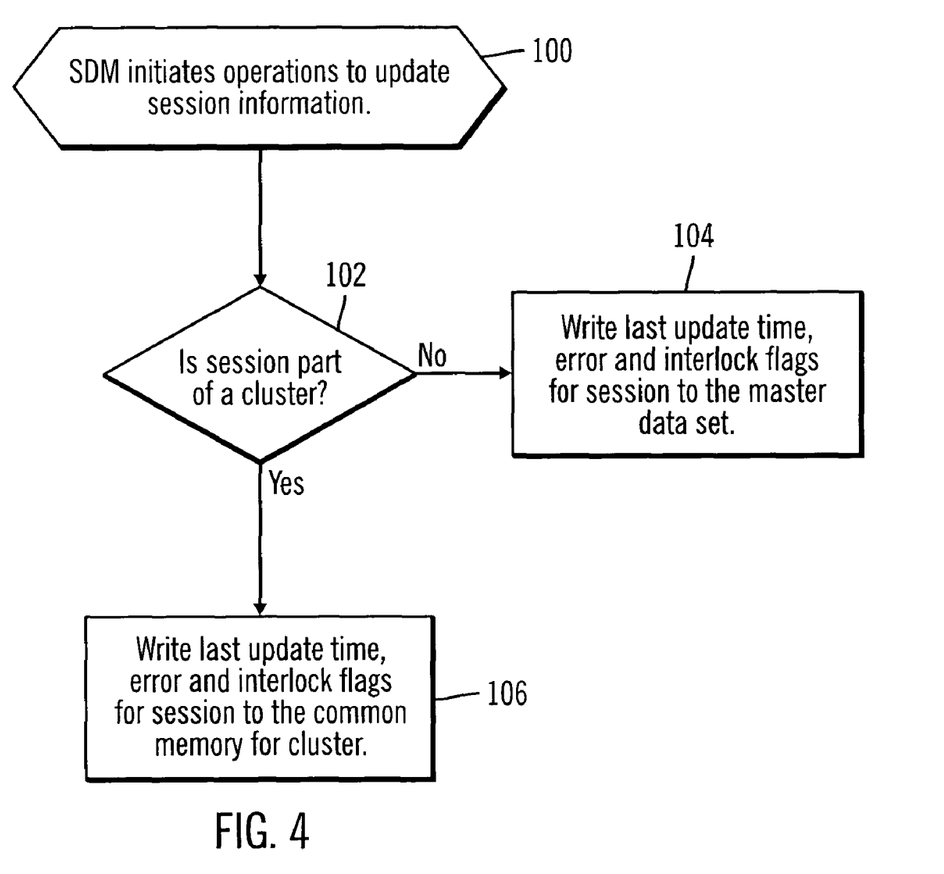
FIG. 4 illustrates an embodiment of operations to update session information.

FIG. 4 illustrates operations performed by an SDM 8a ... 8n to update the individual session information 50 for the session managed by the SDM 8a ... 8n. Upon the SDM 8a ... 8n initiating (at block 100) the operation to update the session information, if (at block 102) the session is not part of a cluster, e.g., individual session 25, then the SDM 8n writes (at block 104) the individual session information 50, e.g., most recent update time 54, error 56 and interlock 58 flags for the session, to the master data set 20. If (at block 102) the session is part of a cluster 24, then the SDM 8a ... 8m writes (at block 106) the individual session information 50 to an entry in the common memory 30 for the cluster 24.

Figure 5:
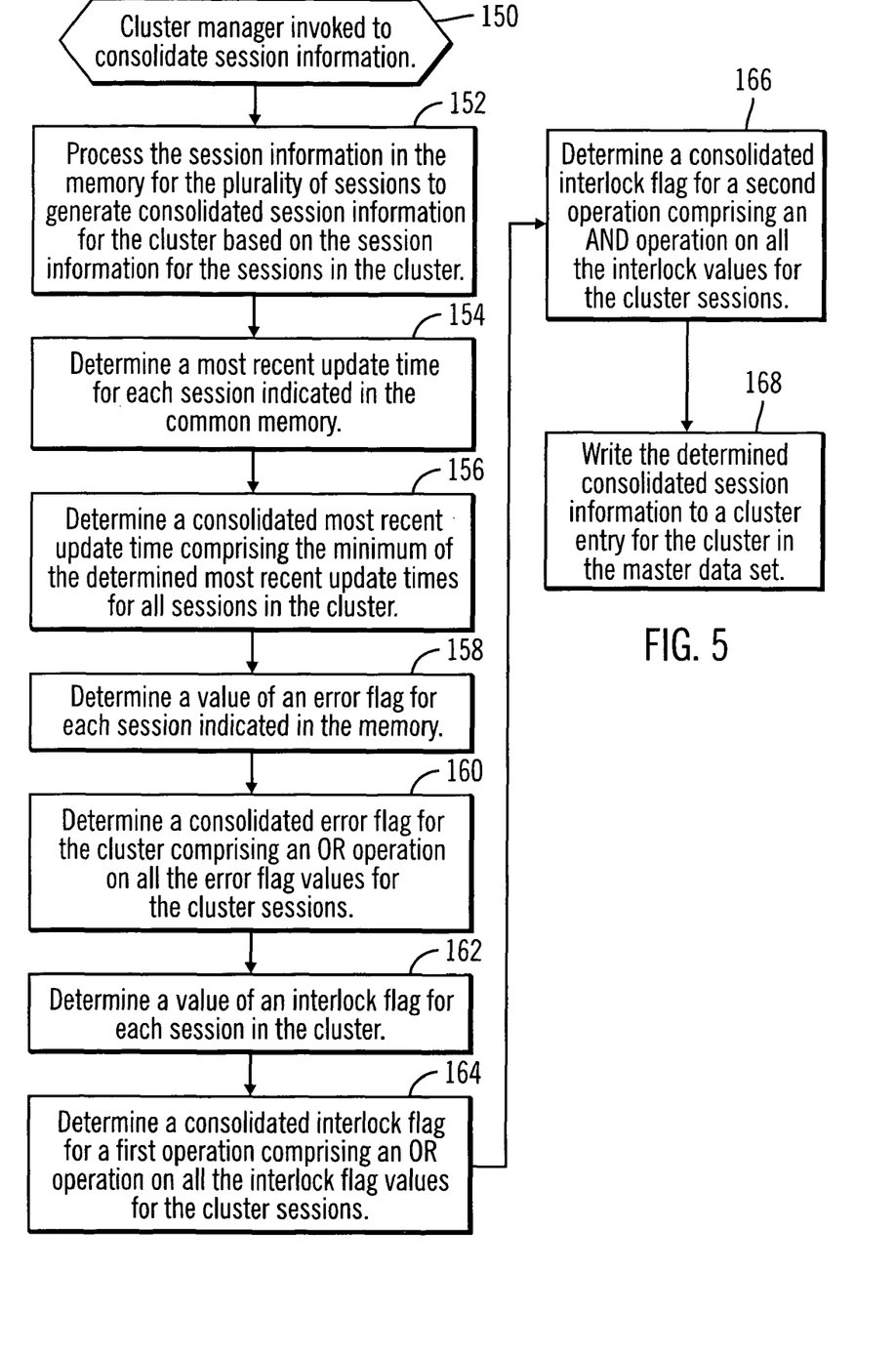
FIG. 5 illustrates an embodiment of operations to consolidate session information for sessions that are part of a cluster.

FIG. 5 illustrates an embodiment of operations performed by the cluster manager 28 to write consolidated session information for the cluster 24 to the master data set 20 to consolidate and reduce the number of write operations to the master data set 20. Upon being invoked (at block 150) to consolidate information, the cluster manager 28 processes (at block 152) the individual session information 50 in the memory 30 for the plurality of sessions in the cluster 24 to generate consolidated session information 70 for the cluster 24. The session information consolidation operation at block 152 may be performed by the operations at blocks 154 to 168. To determine a consolidated most recent update time 74, the cluster manager 28 determines (at block 154) from the individual session information 50 a most recent update time 54 for each session in the cluster 24 indicated in the common memory 30. The cluster manager 28 then determines (at block 156) a consolidated most recent update time 74 comprising the minimum of the determined most recent update times for all sessions in the cluster 24. To determine the consolidated error flag 76, the cluster manager 28 determines (at block 158) a value of an error flag for each session indicated in the memory. A consolidated error flag 76 is determined (at block 160) by performing an OR operation on the error flags 56 determined from the common memory 30.

To determine two consolidated interlock session information values 78 and 80, the cluster manager 28 determines (at block 162) a value of an interlock flag for each session in the cluster 24 from the common memory 30. The cluster manager 28 then determines (at block 164) a consolidated interlock flag for a first operation/function by performing a first type of operation on the interlock flags 58 for the sessions in the cluster 24, such as an OR on all the interlock flags 56 in the individual session information 50 for the sessions in the cluster 24. A second type of operation may be performed (at block 166) on the interlock flags 58 of the individual sessions, such as an AND operation. Different operations may be performed on the same session information when generating consolidated session information for use by different functions that require different operations on the same data. The cluster manager 28 then writes (at block 168) the consolidated session information 70 for the cluster to the master data set 20.

Figure 6:
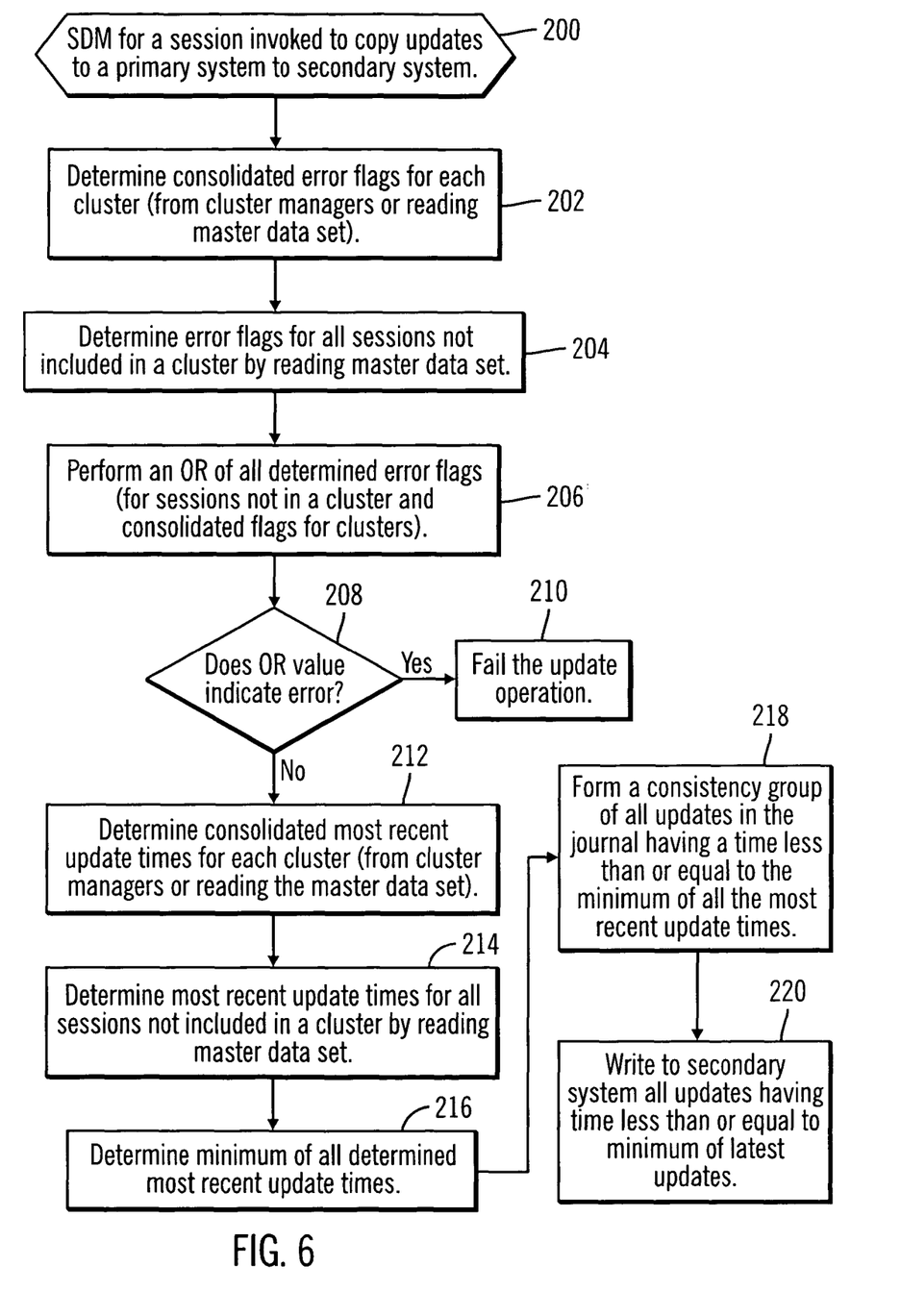
FIG. 6 illustrates an embodiment of operations to copy updates to a primary storage to a secondary storage.

FIG. 6 illustrates an embodiment of operations performed by an SDM 8a . . . 8n to copy updates to the primary storage 6a . . . 6n to the secondary storage 12a . . . 12n. In response to being invoked (at block 200) to copy updates, the SDM 8a . . . 8n determines (at block 202) consolidated error flags 76 for each cluster 24 in the network 2. The SDM 8a . . . 8n may obtain the consolidated error flags 76 by reading the master data set 20 or by calling the cluster managers for all clusters 28 to access the common memories for all clusters to read the error flags for the cluster sessions. In one embodiment, the cluster manager 28 for a clustered session 24 may access the master data set 20 and consolidate entries in the master data set 20 for other clusters and individual sessions 25 to provide to the SDM 8a . . . 8m to use.

The SDM 8a . . . 8n further determines (at block 204) the error flags 56 for all individual sessions 25 not included in a cluster by reading the master data set 20. The SDM 8a . . . 8n then performs (at block 206) an OR of all determined error flags (for individual sessions 25 not in a cluster and consolidated error flags 76 for the clusters). If (at block 208) the OR value indicates an error, e.g., has a value of one, then the update operation is failed (at block 210) because a failure of one session causes a failure throughout the coupled session environment. If (at block 208) the OR value indicates that there is no error in any session, then the SDM 8a . . . 8n determines (at block 212) the consolidated most recent updates 74 for each cluster (from cluster managers 28 or reading the master data set 20). The SDM 8a . . . 8n further determines (at block 214) the most recent update times 54 for all individual sessions 25 not included in a cluster 24 by reading the master data set 20. The SDM 8a . . . 8n then determines (at block 216) the minimum of all the determined most recent update times for all sessions in the coupled environment. The SDM 8a . . . 8n then forms (at block 218) a consistency group of all updates in the journal 26a . . . 26n having a time less than or equal to the minimum of all the most recent update times and then writes (at block 220) the updates in the formed consistency group to the secondary storage 12a . . . 12n. In this way, consistency is maintained across all clustered sessions and individual sessions in the coupled session environment.

Figure 7:
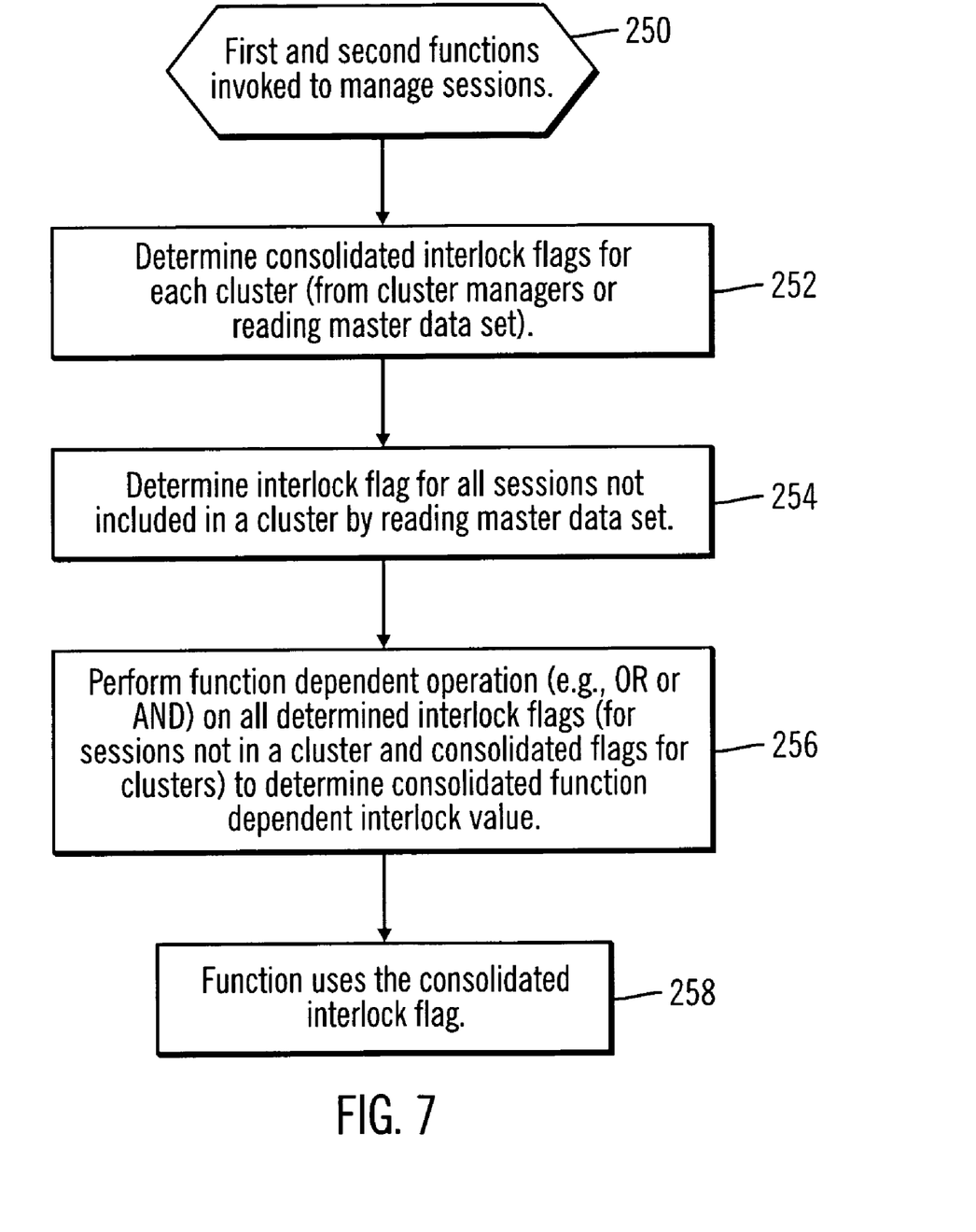
FIG. 7 illustrates an embodiment of operations for functions to consolidate and use session information.

FIG. 7 illustrates an embodiment of operations performed by different functions that use the session information. These functions may be part of the SDMs 8a . . . 8n, the cluster managers 28 or some other component. In response to one of the functions being invoked (at block 250), the functions (or another component) determine (at block 252) consolidated interlock flags 78 for each cluster 24 (from cluster managers or reading the master data set 20) and determines (at block 254) interlock flags 58 for all individual sessions 25 not included in a cluster by reading the master data set 20. The function dependent operation (e.g., an OR, AND or other function) is then performed (at block 256) on all the determined interlock flags for all the sessions in the coupled environment to determine a consolidated function dependent interlock value across all sessions. The function uses (at block 258) the determined consolidated interlock value. In alternative embodiments, the operations of FIG. 6 may be performed with respect to session information other than an interlock flag.

With the described embodiments, the number of writes for a cluster of sessions to the master data set is reduced by having the cluster manager consolidate session information for sessions in a cluster managed by a single processor. Further, the number of reads is reduced because the information necessary to perform update related operations, such as the most recent update time and error flag, is consolidated for each cluster into consolidated session information that provides session information for multiple sessions in the cluster. Thus, as the number of sessions in the coupled environment increases, the number of reads and writes to the master data set does not necessarily likewise increase, especially for sessions added in a cluster. Reducing the number of reads and writes to the master data set reduces the delays sessions must wait to access the master data set before access by other sessions completes.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    storing in a memory of a first processor session information for each of a plurality of sessions comprising a cluster, wherein each session associates at least one primary system and at least one secondary system, wherein within each session, updates are copied from the at least one primary system to the at least one secondary system;
    processing the session information in the memory for the plurality of sessions to determine a most recent update time for each session indicated in the memory;
    generating first consolidated session information for the cluster comprising a minimum of the determined most recent update times based on the session information for the sessions in the cluster; and
    writing the first consolidated session information for the cluster to a master data set maintaining information for sessions, wherein the master data set is adapted to include information from coupled sessions associating at least one primary storage and at least one secondary storage that are managed by additional processors;
    reading, by the additional processors, the first consolidated session information in the master data set to determine the minimum of the most recent update times across all the coupled sessions indicated in the master data set to maintain data consistency across coupled sessions;
    determining a value of a state flag for each session indicated in the memory, wherein the state flag indicates whether the session is consistent with all other sessions represented in the master data set;
    performing an OR operation on the determined values to determine second consolidated session information for a first operation; and
    performing an AND operation on the determined values to determine third consolidated session information for a second operation.

2. The method of claim 1, further comprising:
    writing information on a session not included in the cluster to the master data set, wherein the session not included in the cluster associates at least one primary system and at least one secondary system such that updates are copied from the at least one primary system to the at least one secondary system.

3. The method of claim 2, wherein the session not included in the cluster is managed by a second processor, wherein the first processor manages the copying of updates for the sessions in the cluster.

4. The method of claim 1, wherein the cluster comprises a first cluster and wherein the master data set is adapted to include information from additional clusters including sessions managed by the additional processors.

5. The method of claim 1, further comprising:
determining a value of an error flag for each session indicated in the memory; and
generating fourth consolidated session information by performing an OR operation on all the determined error flags to produce a consolidated error flag, wherein the additional processors managing additional sessions fail an update in response to determining that the consolidated error flag indicates an error.

6. The method of claim 1, further comprising:
processing, by one processor managing at least one session, the information for each cluster or session not included in a cluster indicated in the master data set to obtain a value providing information on all sessions indicated in the master data set; and
processing the value to determine whether to perform write updates from the primary system to the secondary system.

7. A system in communication with primary systems, secondary systems, and a master data set, comprising:
a first processor
a memory coupled to the first processor;
a computer readable medium including code executed by the first processor to perform operations, the operations comprising:
storing in the memory session information for each of a plurality of sessions comprising a cluster, wherein each session associates at least one of the primary systems and at least one of the secondary systems, wherein within each session, updates are copied from the at least one primary system to the at least one secondary system associated with the session;
processing the session information in the memory for the plurality of sessions to determine a most recent update time for each session indicated in the memory;
generating first consolidated session information for the cluster comprising a minimum of the determined most recent update times based on the session information for the sessions in the cluster; and
writing the first consolidated session information for the cluster to the master data set maintaining information for sessions;
determining a value of a state flag for each session indicated in the memory, wherein the state flag indicates whether the session is consistent with all other sessions represented in the master data set;
performing an OR operation on the determined values to determine second consolidated session information for a first operation; and
performing an AND operation on the determined values to determine third consolidated session information for a second operation; and
additional processors enabled to perform reading the first consolidated session information in the master data set to determine the minimum of the most recent update times across all the coupled sessions indicated in the master data set to maintain data consistency across coupled sessions, wherein the master data set is adapted to include information from coupled sessions associating at least one primary storage and at least one secondary storage that are managed by the additional processors.

8. The system of claim 7, wherein the operations further comprise:
writing information on a session not included in the cluster to the master data set, wherein the session not included in the cluster associates at least one primary system and at least one secondary system such that updates are copied from the at least one primary system to the at least one secondary system.

9. The system of claim 8, further comprising:
a second processor, wherein the session not included in the cluster is managed by the second processor, and wherein the first processor manages the copying of updates for the sessions in the cluster.

10. The system of claim 7, wherein the cluster comprises a first cluster and wherein the master data set is adapted to include information from additional clusters including sessions managed by the additional processors.

11. The system of claim 7, wherein processing the information comprises:
determining a value of an error flag for each session indicated in the memory; and
generating fourth consolidated session information by performing an OR operation on all the determined error flags to produce a consolidated error flag, wherein the additional processors managing additional sessions fail an update in response to determining that the consolidated error flag indicates an error.

12. The system of claim 7,
wherein one processor managing at least one session is enabled to perform:
processing the information for each cluster or session not included in a cluster indicated in the master data set to obtain a value providing information on all sessions indicated in the master data set; and
processing the value to determine whether to perform write updates from the primary system to the secondary system.

13. An article of manufacture comprising a computer readable storage medium including code executed by a first processor having a memory and by additional processors, wherein the code is enabled to cause operations to be performed, the operations comprising:
generating a master data set;
storing in the memory session information for each of a plurality of sessions comprising a cluster, wherein each session associates at least one primary system and at least one secondary system, wherein within each session, updates are copied from the at least one primary system to the at least one secondary system;
processing the session information in the memory for the plurality of sessions to determine a most recent update time for each session indicated in the memory;
generating first consolidated session information for the cluster comprising a minimum of the determined most recent update times based on the session information for the sessions in the cluster;
writing the first consolidated session information for the cluster to the master data set maintaining information for sessions, wherein the master data set is adapted to include information from coupled sessions associating at least one primary storage and at least one secondary storage that are managed by the additional processors;
reading, by the additional processors, the first consolidated session information in the master data set to determine the minimum of the most recent update times across all the coupled sessions indicated in the master data set to maintain data consistency across coupled sessions;

determining a value of a state flag for each session indicated in the memory, wherein the state flag indicates whether the session is consistent with all other sessions represented in the master data set;

performing an OR operation on the determined values to determine second consolidated session information for a first operation; and performing an AND operation on the determined values to determine third consolidated session information for a second operation.

14. The article of manufacture of claim 13, wherein the operations further comprise:

writing information on a session not included in the cluster to the master data set, wherein the session not included in the cluster associates at least one primary system and at least one secondary system such that updates are copied from the at least one primary system to the at least one secondary system.

15. The article of manufacture of claim 14, wherein the article of manufacture further includes code executed by a second processor managing the session not included in the cluster, wherein the first processor manages the copying of updates for the sessions in the cluster.

16. The article of manufacture of claim 13, wherein the cluster comprises a first cluster and wherein the master data set is adapted to include information from additional clusters including sessions managed by the additional processors.

17. The article of manufacture of claim 13, wherein processing the information comprises:

determining a value of an error flag for each session indicated in the memory; and generating fourth consolidated session information by performing an OR operation on all the determined error flags to produce a consolidated error flag, wherein the additional processors managing additional sessions fail an update in response to determining that the consolidated error flag indicates an error.

18. The article of manufacture of claim 13, wherein the article of manufacture further includes code executed by one processor managing at least one session to perform operations comprising:

processing the information for each cluster or session not included in a cluster indicated in the master data set to obtain a value providing information on all sessions indicated in the master data set; and processing the value to determine whether to perform write updates from the primary system to the secondary system.

* * * * *